United States Patent [19]

Vetter

[11] 4,377,184

[45] Mar. 22, 1983

[54] PLUG

[76] Inventor: Manfred Vetter, Burg Langendorf, 5352 Zülpich, Fed. Rep. of Germany

[21] Appl. No.: 204,756

[22] Filed: Nov. 6, 1980

Related U.S. Application Data

[63] Continuation of Ser. No. 118,071, Feb. 4, 1980, abandoned, which is a continuation of Ser. No. 955,640, Oct. 27, 1978, abandoned.

[30] Foreign Application Priority Data

Oct. 29, 1977 [DE] Fed. Rep. of Germany ....... 2748614

[51] Int. Cl.$^3$ ............................................. F16L 55/12
[52] U.S. Cl. ......................................... 138/89; 138/93
[58] Field of Search ................... 138/89, 90, 93, 94

[56] References Cited

U.S. PATENT DOCUMENTS

| 2,678,666 | 5/1954 | Theis et al. | 138/93 |
| 3,276,481 | 10/1966 | McNulty | 138/93 |
| 3,459,230 | 8/1969 | Smith | 138/93 |

Primary Examiner—James E. Bryant, III
Attorney, Agent, or Firm—Michael J. Striker

[57] ABSTRACT

A plug includes an elongated tubular casing of elastomeric material having two open ends longitudinally spaced from each other. Two upper caps are inserted in respective open ends of the casing so as to bound with the same an interior of the plug. Each of the caps has a circumferentially elongated wall extending inside the interior in surface contact with the corresponding portion of the inner surface of the casing. Each of the mentioned walls is vulcanized to the corresponding portion of the inner surface of the casing so as to sealingly close the latter from both ends thereof.

12 Claims, 2 Drawing Figures

PLUG

This is a continuation of application Ser. No. 118,071, filed Feb. 4, 1980, now abandoned, which in turn is a continuation of application Ser. No. 955,640, filed Oct. 27, 1978, now abandoned.

BACKGROUND OF THE INVENTION

The present invention relates to an arrangement for sealing tubes or pipes.

It is known in the art to use different sealing plugs when it is necessary to seal a tube or pipe (e.g., which has sprung a leak) with minimum time expenditure. Should, for example, leakage take place in the tube then such a plug can be installed to reliably stop such leakage. In this case the plug is to be installed very quickly and effectively in the tube upstream of the point where the leakage has occurred.

It is to be understood that such a leakage can cause a lot of subsequent undesired consequences such as spreading around the broken tube liquids which are potentially dangerous to the ground water, environmental pollution, or even a flood. For example, environmental pollution may occur as a result of an accident involving damage to a tanker truck. By installing one of the aforementioned plugs one can reduce or eliminate the undesired leakage.

Such plug (see, for example, German Gebrauchsmuster 75 11 806) may include an expandable tubular casing. Both open ends of the casing are closed by rigid end plates. The plates are connected to the casing and define between their outer circumferences and the inner circumference of the tube to be plugged a small radial clearance. Such an arrangement has certain disadvantages, which reside for example from the connection of the end plates to the tubular casing of the plug by means of clamping rings. The clamping rings press the outer surfaces of the end plates and the respective end portions of the casing together. Obviously, such an arrangement is not fully reliable for repeated use since after having been used a few times such a plug tends to permit leakage rather than to stop the same. Besides, due to the required small radial clearance between the outer circumference of the end plates and the inner circumference of the tube to be plugged, the range of application of such a plug is rather limited. Should one install in the tube to be plugged a plug of too small an outer diameter there is always a danger that the rigid end plates of such a plug will take an inclined position relative to the cross-section of the tube and then the plug will then fail to provide a satisfactory seal.

SUMMARY OF THE INVENTION

It is a general object of the present invention to avoid the disadvantages of the prior art sealing plugs for tubes and pipes.

More particularly, it is an object of the present invention to provide a plug which ensures a sturdy reliably and lasting sealing closure of a tube to be plugged.

Another object of the present invention is to provide a flexible plug which can easily be installed in a tube to be plugged.

In pursuance of these objects and other which will become apparent hereafter, one feature of the present invention resides in providing an elongated tubular casing of elastomeric material having two open ends longitudinally spaced from each other. There are further provided two cupped caps each inserted in a respective open end of said casing and bounding with the same an interior of the plug. Each of said caps has a circumferentially elongated wall extending inside said interior in surface contact with the corresponding portion of the inner surface of said casing. Each of said walls is vulcanized to the corresponding portion of said inner surface of the casing so as to sealingly close the latter from both ends thereof. The surface contact, obtained by means of vulcanizing the caps on the tubular casing ensures a reliably long sealing closure of the plug. Both caps as well as the casing may be made of reinforced sturdy material. Inasmuch as the plug is a sturdy element any additional precautionary measure may be substantially eliminated. Due to utilization of sturdy material for the parts of the plug, the latter has a fixed form and shape-holding ability in its non-inflated condition. Under working condition the casing bulges outwardly, thus increasing the maximum outer diameter of the plug almost twice as compared to the initial outer diameter. It is to be understood that any danger that the plug will take an inclined position relative to the elongation of the tube is eliminated.

Another advantageous feature of the present invention resides in making the circumferential wall of each cap of conical shape, that is converging towards the edge in the direction inside the interior of the plug. This feature ensures on the one hand that the tubular casing will bulge uniformly from both ends towards its middle when the plug is inflated. On the other hand, the pressure which acts upon the connection between the caps and the casing will be distributed uniformly along the whole area of contact between the caps and the casing. As a result, any danger of local tearing of the contacting surfaces, which is likely to occur in the prior art plugs due to local increase of the applied pressure, is eliminated.

The tubular casing is reinforced in axial direction. Such a longitudinal reinforcement insures that both end faces of the plug will remain parallel to each other, and simultaneously it increases the deformation resistance of the plug in non-inflated condition.

When the plug is inflated it does not expand in longitudinal direction thereof, since the longitudinal reinforcement prevents any such longitudinal expansion of the casing. On the contrary, the casing is subject to considerable contraction in the longitudinal direction, so that the plug changes its outer form from the initial more or less cylindrical to a wheel-like shape.

Due to the longitudinal reinforcement any movement of the plug when the latter is inflated, relative to the inside wall of the tube, is excluded. Therefore any rubbing or scrubbing of the plug against the inner wall of the tube is eliminated.

Advantageously, an annular reinforcement element may be provided which is located at the inner side of the casing. Thus, the reinforcement element can not by any chance obstruct the circumferential clearance between the outer surface of the casing and the inner surface of the tube to be plugged. In other words the reinforcement element can not negatively influence the desired plugging effect when the plug is inflated.

Accordingly, one of the caps is supported from inside thereof by a reinforcing or supporting ring which abuts with its outer surface the inner surface of the elongated wall of said one cap. This ring may be made of rubber or metal. Primarily, this ring serves as a support when this one cap is vulcanized to the corresponding portion of the casing. During vulcanizing the wall of the cap must be pressed against the corresponding portion of the casing in order to guarantee a reliable and secure connection between the casing and the cap. The ring, which advantageously has a conical cross-section, serves as a support for the elongated wall, counteracting the pressure acting upon the mating portion of the inner surface of the casing.

Inasmuch as a tube to be sealed usually has a circular cross-section, the plug in accordance with the present invention has a substantially cylindrical outer form in non-inflated condition.

It is to be understood, however, that the plug may have any other outer form, for example oval or elliptical.

It is also possible to provide a plug which includes a first casing of relatively smaller outer diameter which is inserted in a second casing of relatively larger outer diameter. In this case both (or more) casings are of the same axial length, and their end faces are formed as discs. Such combination of plugs can be used to plug a tube of relatively large inner diameter. On the other hand the inside passage can be used in order to provide an access to the blocked (sealed-off) portion of the tube.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
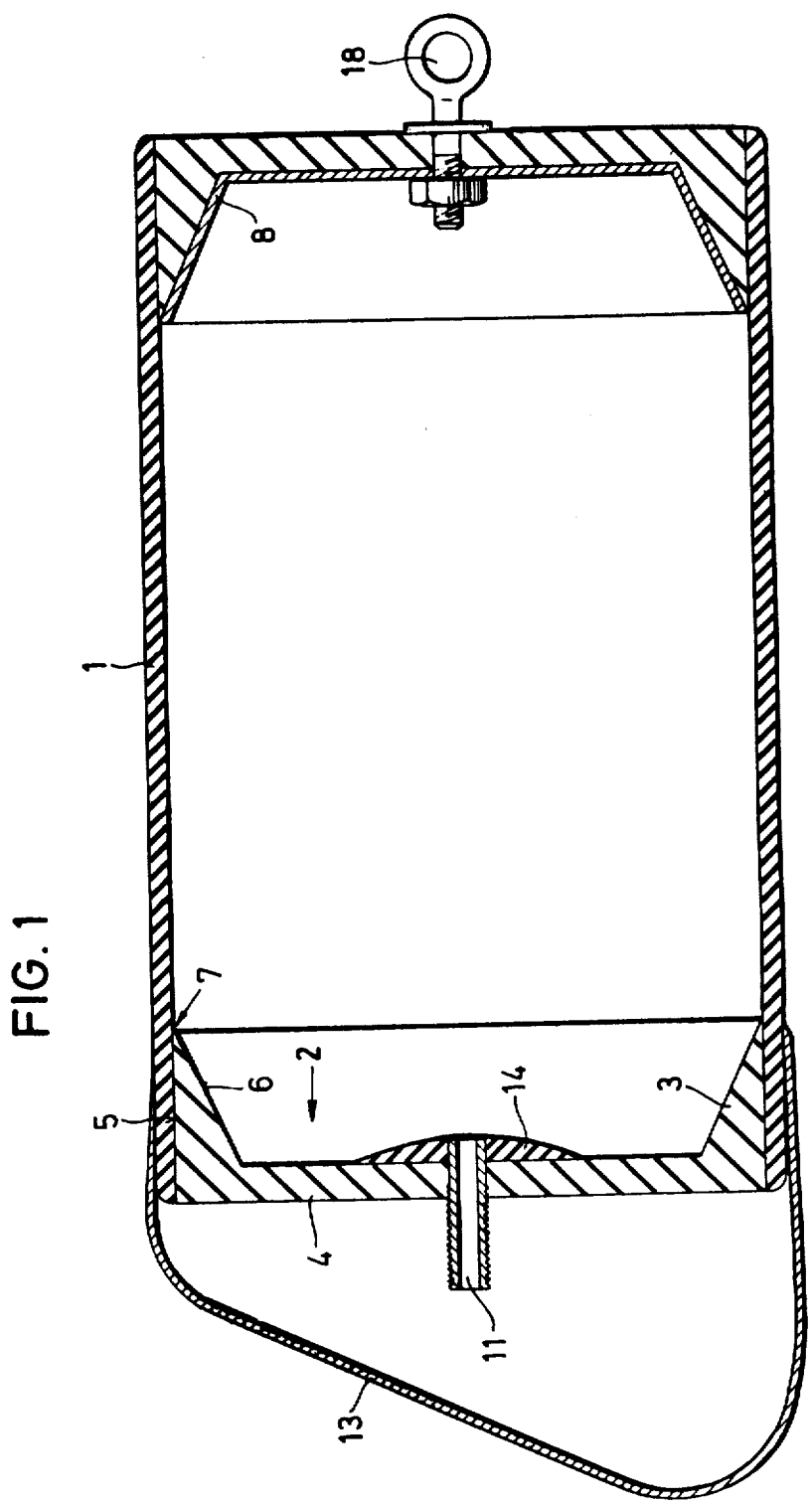
FIG. 1 is an axially-sectioned view of a plug in accordance with the present invention.

Referring now to the drawings and first to FIG. 1 thereof, it may be seen that the reference numeral 1 designates a tubular casing which is closed at the respective ends thereof with cup-shaped caps 2. Each of the caps 2 is slipped into the casing 1 at the respective end thereof. The overall length of the plug is defined substantially by the length of the casing 1. The overall length of the plug is preferably one and a half times larger than the outer diameter of the caps 2. The casing 1 and the caps 2 are made of synthetic or natural rubber and all three parts are reinforced. In the illustrated embodiment the wall of the casing 1 is reinforced with a steel cord filament 19 which extends axially along the elongation of the casing, whereas both caps 2 are reinforced with textile inserts embedded crosswise in each of the caps 2.

Both caps 2 have a cup-like cross-section, and each includes an end wall 4 which is formed as a circular disc and a circumferential wall 3. The outer surface 5 of the circumferential wall 3 extends normal to the end wall 4 and coincides with the outer peripheral surface of the end wall 4. The inner surface 6 of the circumferential wall 3 extends conically relative to the outer surface 5, so that the outer and inner surfaces of the wall 3 meet each other at the circumferential edge 7 and in cross-section these two surfaces define a conical portion diverging towards the end wall 4. The inside and outside surfaces of the wall 3 include between each other an angle of about 25°.

Each of the caps 2 (see FIGS. 1 and 2) is so slipped into the casing 1 at the respective ends thereof, that the outer surface of the end wall 4 of each cup 2 is flush with the respective end face of the casing 1. The outer circumferential surfaces 5 of both walls 3 are vulcanized to the respective inner surface of the casing 1, so as to ensure a strong reliable connection between the caps 2 and the casing 1. The caps 2 are connected to the casing 1 along the respective contact surfaces, which fact guarantees a durable and secure connection between the casing 1 and the caps 2. It is to be understood that primarily for this very reason, that is to obtain a reliable surface contact between the casing 1 and the caps 2 the latter have a cup-shaped cross-section.

The conical cross-section of the wall 3 renders it possible to advantageously obtain uniform distribution of pressure, when the plug is inflated, in the area of connection between the casing 1 and the caps 2. Due to this form of the caps 2 the casing 1 is contracted uniformly from its both ends towards the middle of the casing 1.

Figure 2:
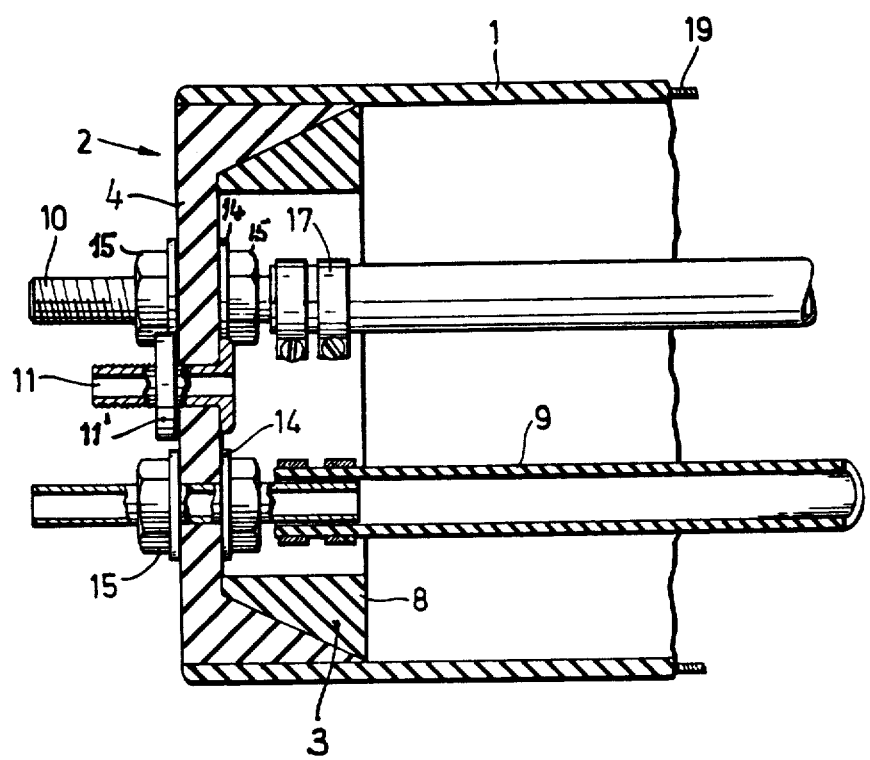
FIG. 2 is an axially-sectioned view of a portion of another embodiment of the plug.

In order to be able to apply sufficient pressure between the outer surface 5 of the wall 3 and the casing 1 when the caps 2 are vulcanized on the casing 1 the inner surface 6 of the wall 3 is supported by a conical supporting ring 8. Should the two caps 2 be vulcanized to the casing 1 one after another, rather than simultaneously, then it is sufficient to provide only a single supporting ring 8 (see FIG. 1) since to vulcanize the first cap to the casing it is possible to use a conventional supporting mandrel which in this case is inserted in the casing 1 from the other open end thereof. The cup-shaped supporting ring 8 (see FIG. 1) is also designed for mechanically supporting parts or elements which are to be connected to its end wall 4. For example, an eye or ring 18 may be anchored to the supporting ring 8 in this manner. The supporting ring 8 may for example, be made of metal. The supporting ring 8 may also be made of elastomeric material (see FIG. 1) for example of the same material as that of the casing 1 and the caps 2, that is synthetic or natural rubber. As shown in FIG. 2 the ring 8 has a truncated conical cross-section and is provided with a central inner hole.

The plug will further be provided with an arrangement for inflating it with fluid (i.e., liquid or gas) to thereby bulge the casing when the plug is inserted in the tube to be plugged. In such an inflated condition the plug obstructs the passage of the tube to be sealed, thereby preventing any leakage from this tube when the plug is installed upstream of the leak. The inflating arrangement is mounted on the end wall 4 of one of the caps 2 and provides access to the interior of the plug from outside.

In the embodiment shown in FIG. 1 this arrangement includes a nipple 11 mounted on the end face 4 of one of the caps. The end wall 4 is reinforced in the area of the nipple 11 with a disc 14 which has spherical segment-shaped cross-section. The disc 14 is of elastomeric material, and is vulcanized to the inner surface of the end wall 4. Due to this vulcanization the nipple 11 is fixedly connected to the end wall 4 and the disc 14. The nipple 11 is preferably of metal, e.g., brass, and is provided with an outer thread portion which extends outwardly beyond the end wall 4. This portion is operative to be connected through a coupling with a source of pressure fluid, e.g., a pumping device (not shown). As may be seen from FIG. 2, the nipple 11 is formed as a hollow screw, which is rigidly secured to the end wall 4 by means of a nut 11'. The sealing connection of the nipple 11 to the end wall 4 is ensured by vulcanizing of the disc 14 to the nipple 11 and to the inner surface of the end wall 4.

FIG. 2 shows an embodiment of a sealing plug which may also be used for testing purposes, that is for example to test pressure in the portion of the tube upstream of the location of the plug. Thus, even after the plug has been inserted in the tube an operator still has access to the interior of the tube upstream of the plug. The embodiment shown in FIG. 2 has three tubular elements 10, each of which extends through the end walls 4 of both caps into the interior of the plug (only one cap shown). The elements 10 are so located on the end walls 4 that each of them has small portions of at least a few centimeters length which project beyond the respective end wall 4 at both sides thereof. Each tubular element 10 is connected to the end wall 4 by means of two nuts 15 and two washers 14. Besides that, by vulcanizing the material around the tubular elements 10 one can obtain correspondingly sealing connection of the same with the respective end walls 4. Communicating conduits 9 are installed on the portions of the tubular elements 10 which extend inside the plug. The communicating conduits 9 are vulcanized to the tubular elements 10. In addition thereto, each of the communicating conduits 9 is pressed to the respective element 10 by means of two hose clamps 17. After the hose clamps 17 are heated they are retightened, thus ensuring reliable connection between the elements 10 and the conduits 9.

It is to be noted that after the caps 2 have been vulcanized to the casing 1 there is no access to the interior of the plug. Therefore, the conduits 9 have to be mounted and fixed on the elements 10 very carefully since there will not later be a chance to correct even a small mistake, after the caps are vulcanized to the casing 1. The conduits 9 have to be flexible, because both end walls 4 of the plug are subject to displacement towards each other when the plug is being inflated. In all respects other than those mentioned above, the plug of FIG. 2 corresponds to the plug shown in FIG. 1.

It is to be further noted that any danger of tension stresses on the conduits 9 must be eliminated. To insure this, the casing 1 is so reinforced that the opposite end walls 4 can move away from each other only to an extent which does not subject the conduits 9 to any tension whatsoever.

In the non-inflated condition, the plug on the whole has a cylindrical form. However, it is to be mentioned that the plug can have any other form; for example, for sealing waste-water tubes which have relatively larger cross-section, it is advantageous to use plugs having an elliptical or other shape rather than a cylindrical one. When the plug is being inflated the casing 1 contracts axially while at the same time expanding radially so as to define a bulge substantially at or near the (axial) middle of the casing 1. The opposite end walls 4 of course move towards each other during this. Eventually the inflated plug takes the general form of a wheel, with the caps 2 being the hubs of that wheel. The diameter of the plug measured in the middle portion thereof, that is the portion where the bulge after inflation is at its maximum, is almost double as compared with the diameter measured at the same place but with the plug in the non-inflated condition. In order to facilitate such expansion, the plug has of course to have an adequate length. Advantageously, the length of the plug is equal to about one and a half times the outer circumference thereof in the non-inflated condition. The end wall 4 having the nipple 11 may further be provided with a carrying loop 13 (see FIG. 1) which is also vulcanized to the casing 1. The loop 13 serves to carry the plug from one place to another. The eye 18 can be used for inserting therein a guiding rope (not shown). The guiding rope can be used to facilitate process of introducing the plug into the tube as well as withdrawing the plug from the tube.

It is to be mentioned that the plug as shown in FIG. 1 can be inserted in the tube to be plugged with either end of the plug first. For example, should the plug be inserted in the tube with its end wall having the nipple 11 in a trailing position then this nipple 11 can serve as a passage to introduce a pressure medium therethrough into the interior of the plug, to thereby expand the casing and seal the tube. If fluid flowing in the tube to be sealed is of the right type, e.g., gaseous or a liquid of sufficiently low viscosity, and is at adequate pressure, then the end wall with the nipple 11 can be inserted first, so that the fluid in the tube itself will expand the casing.

It will be understood that each of the elements described above, or two or more together, may also find a useful application in other types of plugs differing from the types described above.

While the invention has been illustrated and described as embodied in a plug, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A plug, particularly for plugging a tube or pipe, comprising an elongated tubular casing of elastomeric material having two open ends longitudinally spaced from each other; two cupped caps each inserted in a respective open end of said casing and bounding with said casing an interior of the plug, each of said caps having a conical cross-section circumferentially elongated wall extending inside said interior and having an outer surface in surface contact with a corresponding portion of the casing, each cap also having an inner surface, each of said walls being vulcanized to said corresponding portion of the casing so as to sealingly close the latter from both ends thereof; and a conical cross-section supporting ring mounted so as to support at least one of said caps and located so as to engage the inner surface of said one cap and urge said elongated wall thereof against the corresponding portion of the casing, each of said caps further comprising an end wall peripherally connected to the respective elongated wall, at least one of said end walls extending normal to the elongation of said casing and being even with a respective end face of said casing when said caps are in assembly with said casing, the end wall of at least one of said caps being provided with at least one through-going hole; and means for facilitating movement of the plug relative to the tube to be plugged, said facilitating means including a member fixedly mounted on one of said caps and extending outwardly away from the same.

2. A plug as defined in claim 1, wherein the axial length of said casing is three times larger than the outer diameter thereof in non-expanded condition.

3. A plug as defined in claim 1, wherein said supporting ring is constituted of metal.

4. A plug as defined in claim 1, wherein said supporting ring is constituted of rubber.

5. A plug as defined in claim 1, wherein said casing is provided with reinforcements extending axially of said casing.

6. A plug as defined in claim 1, and further comprising means for connecting said interior of the plug with the exterior thereof.

7. A plug as defined in claim 6, wherein said connecting means include tubular means extending from the exterior of the plug into the interior thereof through said hole.

8. A plug as defined in claim 1, wherein said member is a ring.

9. A plug as defined in claim 1, and further comprising means for carrying the plug.

10. A plug as defined in claim 9, wherein said carrying means include a carrying loop fixedly mounted on the casing adjacent to one of said caps and extending outwardly away from said cap.

11. A plug as defined in claim 1 wherein the axial length of said casing is larger than the outer diameter thereof in non-expanded condition.

12. A plug as defined in claim 11, wherein the axial length of said casing is equal to about one and a half times the outer diameter thereof.

* * * * *